United States Patent [19]
Schmidt et al.

[11] Patent Number: 5,340,962
[45] Date of Patent: Aug. 23, 1994

[54] AUTOMATIC CONTROL OF LASER BEAM TOOL POSITIONING

[75] Inventors: Robert H. Schmidt, Minnetonka; Dan Martin, Minneapolis, both of Minn.

[73] Assignee: Lumonics Corporation, Minneapolis, Minn.

[21] Appl. No.: 929,942

[22] Filed: Aug. 14, 1992

[51] Int. Cl.[5] ............................................. B23K 26/04
[52] U.S. Cl. .......................... 219/121.78; 219/121.83
[58] Field of Search ..................... 219/121.78, 121.79, 219/121.83

[56] References Cited

U.S. PATENT DOCUMENTS

| | | | |
|---|---|---|---|
| 3,596,050 | 7/1971 | Tikijian | 219/131 |
| 4,298,784 | 11/1981 | Schmall | 219/124.02 |
| 4,794,222 | 12/1988 | Funayama et al. | 219/121.78 |
| 5,067,086 | 11/1991 | Yamazaki et al. | 219/121.83 X |
| 5,118,918 | 6/1992 | Serrano | 219/121.78 |

FOREIGN PATENT DOCUMENTS

| | | | |
|---|---|---|---|
| 0021491 | 2/1984 | Japan | 219/121.74 |
| 0054487 | 3/1984 | Japan | 219/121.83 |

*Primary Examiner*—C. L. Albritton
*Attorney, Agent, or Firm*—Faegre & Benson

[57] ABSTRACT

Laser machining system with x, y and z axis translational movement and C and D axis rotational movement of a beam positioning device to perform automatic tracking over the surface of a workpiece at a constant distance utilizing a sampled capacitive sensing device operative in the refractory interval between laser pulses. The system also automatically determines the normal vector to the part surface and is controllable along a selectable axis for accurate tracking the focal point of the beam across the surface of the workpiece even when the beam is oriented at an angle other than normal to the surface of the workpiece. The system also provides for control of the of the focal point of the beam at a particular displacement from the machining nozzle tip, using a least means squares curve fitting technique and further provides for identification of a mounting fixture unique to a workpiece by sensing coding on the surface of the fixture thereby to select a particular part machining program.

12 Claims, 3 Drawing Sheets

AUTOMATIC CONTROL OF LASER BEAM TOOL POSITIONING

BACKGROUND OF THE INVENTION

This invention relates to the automatic control of welding, cutting and related applications utilizing a laser beam tool to perform operations on a workpiece. Specifically the invention relates to apparatus and methods for determining and controlling the position and orientation of a tool head relative to a workpiece for carrying out programmed instructions for manufacturing operations. More specifically it relates to measuring and controlling the distance between the tool and the workpiece as the machine operates, determining the location of the focal point of the laser beam and optimally aligning it relative to the surface of the workpiece and for calculating the orientation of a tool control axis normal to a complex surface of a workpiece. The system also includes provision for recognizing the programs to be run for a sequence of operations by recognizing the tooling of the workpiece to identify the part program of operations related to the particular workpiece.

SAMPLED SENSING

Automatic focus control is mandatory in laser cutting and welding processes if the shape of the part being cut or welded does not exactly conform to the part program which guides the laser nozzle or other tool over the part at, desirably, a constant separation or gap between the nozzle tip and the part. It is often the case that the part is either warped or fixtured slightly out of the correct position or moves due to stress relief as it is being cut or welded. If the gap varies appreciably from the specified value, the focal point of the laser beam, located a small distance below the nozzle tip, will not be in the correct location relative to the part and the beam will be "out of focus." If this occurs, the machining processes of cutting, welding, etc. are no longer under control and unsatisfactory cuts or welds will usually result.

It is very desirable, if not mandatory, that the gap be sensed just under the tip of the nozzle i.e. along the axis of the tip rather than offset from the nozzle tip axis. This is quite easily accomplished with capacitive sensors, where the capacitance between the tip of the copper nozzle and the conductive part becomes the frequency determining element of an oscillator. The frequency of the oscillator is inversely proportional to the capacitance which is itself directly proportional to the gap distance. Thus, the separation of the tip and part is sensed just below the nozzle tip.

Examples of such sensing techniques are shown in Tikijian U.S. Pat. No. 3,596,050 which measures the change in capacitance between the part and a metal plate mounted with the tool and in Schmall U.S. Pat. No. 4,298,784 which measures the capacitance as well as an inductance change as a function of the distance from the workpiece to the tool and the lateral position of the workpiece relative to the tool. Such systems, because they rely upon measurement of capacitance between the tool and the workpiece are not suitable for continuously monitoring the tool to workpiece distance while the tool operates if the tool creates an ionized plume as does a $CO_2$ laser welding system.

Eddy current sensors which provide an alternative method for measuring the gap, ideally would have a winding or coil in the nozzle itself in order to measure the gap in close proximity to the focal point of the laser beam. However, a metallic nozzle cannot readily be used in such a system since the nozzle itself would absorb much of the eddy current, rendering the sensor quite insensitive. Furthermore, nonmetallic nozzles often cannot withstand the intense heat of a weld plume. In any case, an imbedded eddy current coil would exhibit temperature effects which are often indistinguishable from eddy current effects due to the temperature coefficient of resistance of copper wire. While a ferrite nozzle would minimize such temperature effects, the relatively low Curie temperature of ferrite renders it useless if it is in close proximity to the beam. Offsetting the eddy current sensor renders it less useful as a sensor, since it is not sensing in close proximity to where the cutting or welding is being done.

While the capacitive sensor is preferred in the prior art for establishing the distance for laser cutting, it is useless for $CO_2$ laser welding, since the conductive weld plume, or plasma, which surrounds the nozzle tip essentially shunts or short circuits the capacitance between the nozzle tip and the part so that monitoring the distance is impossible during periods when the beam is in operation.

Determining Normal Vector to Part Surface

In multi-axis laser machining or processing (i.e. cutting and welding), two alternative methods are commonly used to cause the focus point of the beam to follow a precisely programmed path on the surface of a three dimensional part.

1. Beam motion. Two orthogonal rotary axes fitted with appropriate 45° tilted mirrors, are carried on a 3 dimensional linear coordinate system.
2. The part being processed is rotated under a beam pointed downward by two orthogonal rotary axes commonly called a rotary tilt table.

The two methods theoretically achieve the same purpose, that is, causing the focal point of the beam to follow a precise path on the part surface while keeping the orientation of the beam to the part surface at a programmed angle, usually 90°. Cutting and welding normal (90°) to the part surface has several beneficial effects. Less reflection of the laser beam occurs, causing more power to be absorbed by the workpiece, resulting in faster cutting and deeper penetration welding. The part is effectively thinner when cutting normal to the surface. Other advantages to orienting the beam to be normal to the surface include better processing gas flow dynamics through the nozzle and cut part and an ability to assure the forming of a square cut edge.

When programming the machining operations for a part using a full three dimensional cad cam system, the computer calculates the precise angles of the two rotary stages of the laser positioner so that in practice the unit normal vector which points out of the part surface at the point of incidence is exactly aligned with the axis of the focused beam, the so called $\bar{d}$ vector.

While computers are adept at calculating the compound angles necessary to produce a correct $\bar{d}$ vector of a laser beam that will "poke into" the part surface unit normal vector, humans are not nearly as good at estimating the correct $\bar{d}$ vector when "teaching" a part program how to follow the specific contours of an actual workpiece. Even with special software such as tool center point (focal lock) which causes motion of the rotary axes without losing the focal point (nozzle tip) location, $\bar{d}$ axis estimations are often poor. Errors of 5° to 10° are common. When the errors are then embedded in the part machining program, they can cause jerky motion of the beam positioner, which results in poor cut quality, particularly if the taught reference points are closely spaced.

Selectable Seek Automatic Focus Control

Most automatic focus controls, also referred to as AFCs, utilize a small, often easily damaged, linear servo system which moves the lens/nozzle assembly in a direction parallel to the beam and nozzle under the control of a gap sensor which may use either a capacitor, an eddy current sensor, or some combination thereof, which senses the gap between the nozzle and the workpiece and commands the beam positioner to keep the gap constant when the workpiece is not in its expected position relative to the part program. This may be caused by the part's motion while being laser cut or simply that the part is not exactly the same shape as called for in the part program. In any case, motion of the AFC axis is fixed parallel to the beam and nozzle.

This method of control of the laser tool or nozzle has several disadvantages.

1. The linear lens/nozzle servo is delicate, easily damaged in a collision with a part or fixture, and is expensive.
2. The AFC does not know the exact position of the focal point if the lens servo is off of its nominal programmable position (with no part displacement error), which is usually the case. This is due to the fact that the positioner control using the gap sensor is only in a local position loop, which is dedicated only to keeping the gap constant. Information relative to its displacement of the focal point from the programmed location is not known by the main position loop.
3. Although it is sometimes necessary for an AFC to seek the part surface and maintain a constant gap in an axis not parallel to the axis of the laser beam and lens/nozzle assembly, the prior art AFC systems do not permit such control.

Focal Point Locating

The focal length of economical, commercially available lenses used to focus laser beams is specified by the manufacturer to a tolerance of several percent. A common technique used in industrial laser material processing where energetic lasers are used to cut and weld materials is to move the lens assembly so that the true focal point moves above and "below" the surface of the material.

When a $CO_2$ laser is used, if one adjusts the laser power correctly, a blue spark is observed which is indicative of the laser beam interacting with material when one is at or near the focal point, with the bluest spark occurring when the focal point is positioned on the surface of the part. However, it is difficult to find the focal point in this manner to an accuracy of better than approximately ±0.5 mm. While such accuracy may be acceptable for 2 dimensional (2 axis) cutting or welding, it is often not acceptable for three-dimensional (5 axis) cutting and welding, since the focal point location becomes part of the coordinate system and the focal point of the laser beam may not track the desired point in space. An additional reason that it is difficult to find the exact focal point is that no discrete point exists. Rather the beam makes a smooth transition symmetrically through a focal region.

Since there is no discrete focal point but a continuous "waist" to the beam, the operator is left to judge where the bluest blue occurs, a judgment decision on which two different operators often disagree on and which a single operator often cannot accurately repeat from one trial to the next. Thus, finding the focal point by prior art "cut and try" means that require judgment by the operator is often not an accurate or repeatable procedure.

Another method for finding the focal point is to measure, or listen to, the acoustic emissions emanating from the workpiece as the focal point of the beam passes from a point above the part surface to a point on the part surface and finally to a point below the part surface. Since the energy density of the beam is greatest at the focal point, the acoustic emission is greatest when the focal point is at the part surface. Without further aid, the operator would have to judge at what point the loudest emissions are heard, or measure with a microphone and meter, to determine the focal point.

Automatic Fixture Identification

Finally, it is advantageous for users of laser machines to have a means to select a corresponding part program based on the identity of the part being machined. In the currently available systems, the operator identifies the part to be processed and manually selects the program to be run on the machine.

SUMMARY OF THE INVENTION

Sampled Sensing

It is an object of the present invention to provide a laser machining system in which the control of the distance between the machining nozzle and the workpiece is sensed by a capacitive sensor which is sampled only during the refractory interval between pulses to avoid the errors introduced by the conductive plume present when the laser beam is turned on.

The object above can be attained by provision, in a system for machining a workpiece with a laser beam tool, a control means for maintaining a controlled distance between the tool and a workpiece surface, according to the present invention, comprising capacitive sensor means for measuring the capacitance between the tool and the surface of the workpiece, beam control means for driving the laser beam for the tool with in periodic pulses separated by a refractory interval, sampling means for taking a measurement of the capacitance between the tool and the workpiece during the refractory interval.

Unit Normal Vector Determination

The automatic focus control according to the present invention is unique in that it uses the existing x, y and z translational axes upon which the two rotary axes, C and D, of the beam positioner ride to effect focus control, or, a constant gap between the tip of the nozzle and the workpiece. Since the $\bar{d}$ direction of the laser beam emitted from the beam positioner is a function only of angles C and D, the laser process controller computer uses the C/D angle data to produce a vector equal to $\bar{d}$ using the three linear axes. Translation in this case is parallel to the direction of the beam.

In a preferred embodiment of the present invention a capacitive sensor measures the capacitance between the nozzle tip and the workpiece and a servo position loop causes the linear axes to move in the direction of the $\bar{d}$ vector to achieve a constant value of capacitance and hence a constant distance between the nozzle tip and the part. Other gap sensing means can also be used in connection with the determination of the unit normal vector.

With the AFC arrangement of the preferred embodiment of the present invention, the location of the focal point is always known and it is used to compute the amount of travel required of the linear axes to achieve a constant distance between the nozzle tip and the workpiece. This contrasts with other types of focus control which use a small linear servo system to move the lens and nozzle assembly to keep a constant gap between the nozzle tip and the workpiece.

It is an object of this invention to provide an AFC system for a laser machining system which automatically aligns the laser beam normal to the surface of the workpiece.

The object can be obtained by providing, in a system having an automatic focus control for moving the focal point of a laser beam by movements along orthogonal machine translation axes x, y, and z and orthogonal rotational axes C and D of a multiaxis processing head mounted on the machine, a method for determining a unit normal vector at a point on the surface of a workpiece, said method comprising the steps of a) positioning the focal point of the beam on a reference point on the surface of the workpiece, b) adjusting the C and D processing head axes to orient the beam substantially normal to the surface of the workpiece and the x, y, and z axis to position the focal point coincident with the reference point to orient the beam axis, $\bar{d}$ of the directing head approximately normal to the surface of the workpiece at the reference point, c) defining a local orthogonal coordinate system u, v, and w where $\bar{w}$ is the unit normal vector of the workpiece, is aligned with the $\bar{d}$ by varying the C and D axis rotations and the origin of said local coordinate system is positioned coincident with the focal point of the beam by variation of the x, y, and z axis positions, d) creating a beam focal point moving program in the local coordinate system to move the focal point of the beam to three points P1, P2 and P3 on the workpiece surface which are noncollinear, and preferably equidistant from the origin of the local coordinate system, e) executing the beam focal point moving program in the local coordinate system while the automatic focus control is active thereby to avoid collision between the adjustable head and the workpiece and maintaining a constant gap between the nozzle tip and workpiece while recording the coordinates of the x, y, z, C and D axes at points p1, p2 and p3, f) computing the orientation of a true unit normal vector to the workpiece at the reference point by calculating the cross product of the vectors v1 between P1 and P2 and v2 between P1 and P3, or $$\vec{n} = \frac{\vec{V_1} \times \vec{V_2}}{|\vec{V_1} \times \vec{V_2}|} ; \text{ and}$$

g) adjusting the angles of C and D rotational axes to orient $\bar{d}$ of the adjustable head such that an adjusted $\bar{d}$ is aligned with and in opposition to the unit normal vector $\bar{n}$ at the reference point of the workpiece.

Selectable Seek Automatic Focus Control

Consider a metal cylinder such as a jet engine combustion chamber. Being large and made of relatively thin metal, it is usually "out of round" or has "run out" i.e. its radius varies as a function of rotation. See FIG. 2. Runout errors of 0.1 inch or more are common. A front view of the cylinder would show a wall displacement from its nominal or expected position of $\Delta R = R_{max} - R_{min}$ as a function of rotation. See FIG. 3. If one is cutting normal to the surface, there is no problem; however, if one is cutting at an angle which is intentionally off normal to the surface, then large errors between the desired, i.e. the programmed, cut path and the actual cut path on the part will result.

In order to fully appreciate the magnitude of the errors, consider the following: Specifications require that a row of holes be cut in a cylinder at an angle 75° off normal to the part surface, or 15° off the plane of the part, and that the row of holes be on a "water line", e.g., a straight line in the front view.

It can be shown that autofocus in the direction of the beam causes a sinusoidal displacement of holes relative to the desired waterline where amplitude is proportional to the amount of runout and the angle off normal at which cutting occurs. If $\phi=0°$ e.g. the beam is normal to the part surface, then $\tan\phi=0$ and no displacement error results. However, if $\phi=75°$, then tan 75° =3.73. Therefore E=3.73×$\Delta R$. If $\Delta R$=0.1 inch, then 3.73×0.1=0.373 inches. It is necessary to allow cutting to be conducted at an angle other than perpendicular to the surface of the workpiece without having a row of holes exhibit a substantial deviation from a straight waterline.

Another object of the present invention is providing autofocus control of the focal point of a laser beam by defining a vector using the linear axes of the machine, which is then used for alignment of the beam axis of the nozzle as the nozzle is moved along the axis in response to the error signal from the sensor.

The object above can be attained by providing in a system having an automatic focus control for moving the focal point of a laser beam by movements along orthogonal machine translation axes x, y, and z and C and D rotational axes of an adjustable beam directing head mounted on the machine, a method in accordance with the present invention for positioning the focal point of a laser beam at selected points relative to the surface of a workpiece, the method comprising the steps of a) by varying the orientation of the C and D rotational axes thereby to adjust the beam axis of the directing head to an expected predetermined orientation relative to the surface of the workpiece and aligning the x, y, and z axes to place the beam on one of the selected points, b) using a gap sensor for generating a signal proportional to the displacement between the directing head and the surface of the workpiece and moving the directing head along a selected x, y and z coordinate axis to maintain a predetermined direction as the beam focal point is moved through selected points.

The selectable seek feature of the preset invention operates by allowing the AFC to seek along a selected axis, such as the x axis when cutting off normal rather than seeking along the unit normal axis, $\bar{d}$. The selectable seek operation of the system allows the user to determine the vector direction that will be followed by the AFC in achieving a constant gap. In most operations this selected axis corresponds to $\bar{d}$, i.e. parallel to the beam, but in selected examples it can be selected to move in another direction such as the x axis.

Focal Point Control

In either case, whether using acoustic or optical emission to find the focal point of the laser beam by operator impression, much greater accuracy and repeatability can be obtained by using least squares curve fitting techniques on the data to determine the coefficient $a_1$, $a_2$ of a parabola of the form $y(x) = a_0 + a_1X + a_2X^2$. This technique fits the data to a known parabola with the least error.

It is an object of the present invention to provide a least squares curve fitting technique to enhance the accuracy of positioning the beam focal point on the workpiece surface.

The object above may be attained in a system for machining a workpiece with a laser beam tool which includes control means for maintaining a controlled distance between the tool and a workpiece surface, apparatus for determining when the focal point of the laser beam is optimally positioned at the surface of the workpiece, said apparatus comprising, in combination, means for monitoring an indicia of optimal beam interaction with the surface of the workpiece as the focal point of the beam is moved toward the surface of the workpiece from above and below the workpiece, means for recording the coordinates corresponding to the point where the indicia indicated maximum activity for movement of the beam in both directions toward the surface of the workpiece, and means for analyzing the coordinate points obtained in the recording and analyzing steps above by a least squares method to obtain the coordinates for commanding the machine to maintain an optimum gap distance for positioning the focal point of the beam at the surface of the workpiece.

Fixture Identification

It is an object of the present invention to provide apparatus for simplifying the selection of the part program to be run for a particular workpiece.

The object above can be attained by provision of a fixture identification feature of which provides a means for a user to identify a fixture and select a part program based on that identification.

More specifically the object may be attained in a system for machining a workpiece with a laser beam tool including means for measuring the distance between a sensor positionable by the automatic focus control of the machine and a workpiece surface, means for determining the programs to be run by the machine to process a workpiece in accordance with one of a plurality of processing programs, said means comprising, in combination, sensor means for measuring an indicia applied to a fixture for a workpiece, means for automatically and sequentially moving the sensor means to a series of reference points at predetermined locations on the fixture in accordance with a fixture identification program and measuring the indicia at each point, and means for decoding the indicia pattern to identify and select the program to be run by the machine in accordance with the coding on the particular fixture.

DETAILED DESCRIPTION OF THE INVENTION

The various aspects of the present invention are all related to a machining system for performing various machining operations on a workpiece under control of a computer numerical control (CNC) system. In a preferred embodiment of the invention, the machining operations involved use of a laser beam to perform the machining operations although the various embodiments of the present invention are not necessarily limited to laser machining systems. A suitable CNC laser machining system is disclosed in U.S. Pat. No. 4,555,610, assigned to the assignee of the present application.

Figure 1:
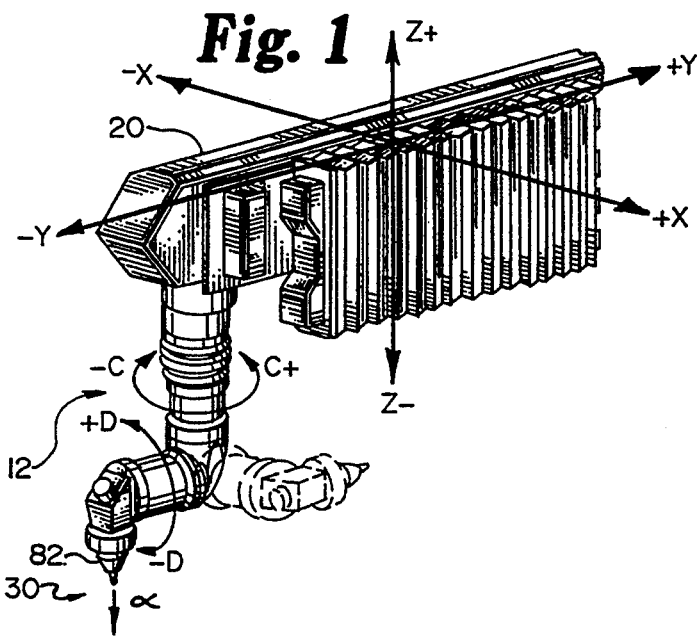
FIG. 1 is a perspective view of the beam positioning device used in the present invention with the x, y and z translational and C and D rotational axes labelled and showing, in phantom outline, rotation of the machining nozzle 90° about both the C and D rotational axes.

The machining system of U.S. Pat. No. 4,555,610 is a system which moves a cutting head along three translational axes. Addition of a beam positioning head 12 to the x axis translational beam 20 of the machining system allows for rotational movement of nozzle 30 about additional axes C and D as shown in FIG. 1.

Sampled Sensing

In utilizing the system of U.S. Pat. No. 4,555,610 with the beam positioning head shown in FIG. 1, it is necessary to provide a means to hold a constant gap between the nozzle tip 82 and the workpiece. That is accomplished in the present invention by using a capacitive sensing technique to sample the gap distance between laser pulses.

It has been determined, by measurement, that if a pulsed laser beam were used for welding that there is a finite time delay between when the beam is switched on and the formation of a conductive plasma plume. It was also determined that there is a finite time delay between when the laser beam is switched off and the plasma decays to zero.

Figure 4:
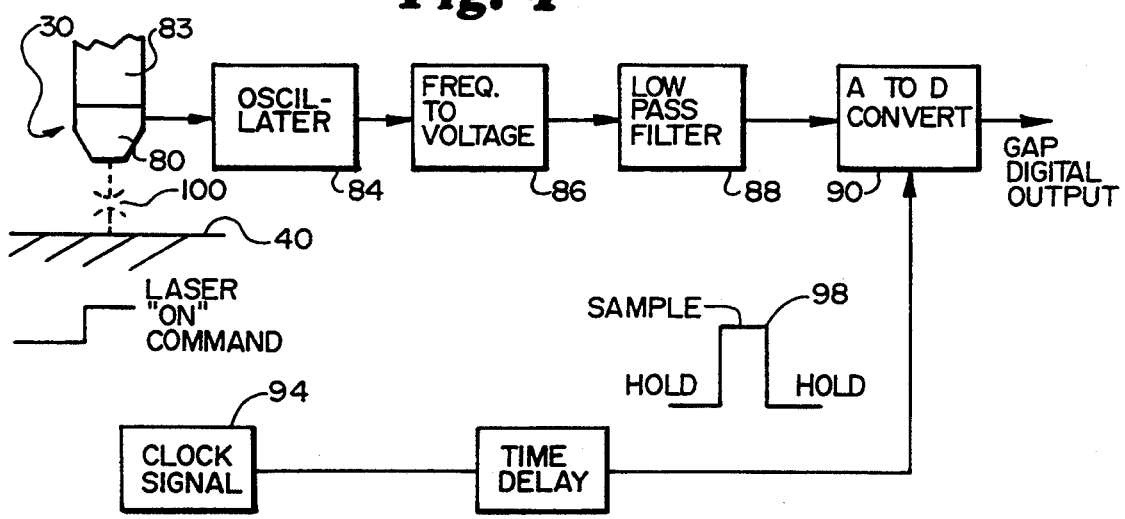
FIG. 4 is a block diagram of the sampled gap sensing apparatus according to the present invention.

A circuit for measuring the gap between the nozzle 30 and the workpiece 40 is shown in FIG. 4. A conductive nozzle tip 80 is isolated from the remainder of the beam positioner by an insulator 82. The conductive tip 80 is connected to an oscillator circuit 84. The capacitance of the gap between tip 80 and the surface of the workpiece is a part of an oscillator tuning circuit forming a part of circuit 84 which produces an output frequency proportional to the size of the gap. The frequency output of oscillator 84 is connected to a conventional frequency to voltage conversion circuit 86 which produces an output voltage proportional to the received frequency. A low pass filter 88 is used to smooth the waveform of the frequency to voltage converter 86. The analog output of the low pass filter 88 is sampled by an analog to digital converter 90 which provides a digital representation of the magnitude of the gap to the AFC servo control loop circuitry each time that the analog signal is sampled. The sampling command to analog to digital converter 90 is initiated by the leading edge of the laser command pulse 92 which is synchronized with a clocking signal from 100Hz source by a time delay means such as a one-shot multivibrator 96 which produces a short sampling signal 98 for the analog to digital converter 90 which causes the analog to digital converter 90 to sample the gap capacitance in the time interval between the leading edge of the laser turn on command pulse and the time that the conductive plume appears.

In a preferred form of the invention, as shown in FIG. 4, the sample and hold was synchronized to occur at the leading edge of the pulse which turns the beam on, sampling and holding a voltage proportional to the gap between the nozzle and workpiece during the time interval before the plasma forms. In a typical system, the time delays between the edge of the laser drive pulse and the commencement or decay of the conductive plume were approximately 200 to 400 $\mu$sec.

One could also sample and hold after a proper time interval after the laser turned off and the plasma decayed, a time interval of about 500 $\mu$sec. The sampling of the nozzle to workpiece gap distance was repeated at a 100 $H_z$ minimum sampling rate in the preferred embodiment to preserve system stability for a servo system having a particular position loop bandwidth.

The nozzle tip 80 and the metallic workpiece can be thought of as two plates of a capacitor 100 whose capacitance is inversely proportional to the gap, d.

$$C = EA/d$$

Where E = permittivity constant and A = effective area. The frequency of the oscillator 84 is proportional to:

$$1/C$$

and hence is directly proportional to d, the gap. As the gap varies, the oscillator frequency varies accordingly. The frequency to voltage converter 86 converts the oscillator frequency to a voltage proportional to the gap (after filtering). The function of the low pass filter 88 is to filter out the oscillator carrier frequency, leaving an analog voltage proportional to the gap. The analog to digital convertor 90 samples the output of filter 88 during the sample time and holds the digital information until the next sample period. The sample time (in this case) is synchronized to the leading edge of the "laser on" pulse. Data is held before the plasma forms. Sampling is repeated at a sufficiently high rate to achieve adequate system stability.

The stored digital data, proportional to the gap, is fed to the computer where it is compared to the desired gap, whereupon the system is caused to move in such a way as to achieve the desired gap.

In order to maximize the effective laser power, it is important that the ratio of laser off time to laser on time be minimized; that is, the laser off time (sample time) should be much less than the sampling period (e.g. 1/100Hz). If sample time, $T_{O}=200$ $\mu$sec, and the sampling period, $T_{S}=1/100$ $H_z=100$ $\mu$sec, then average laser power $$P = P_0 \frac{(T_s - T_0)}{T_s} = \frac{9.8 \, \mu\text{sec}}{10 \, \mu\text{sec}} = .98 \, P_0$$

where $P_O$ is the CW (continuous wave) power.

It is also important that the frequency of the capacitive sensor oscillator 84 be sufficiently high so that its recovery time from the perturbation caused by the conductive plasma is much less than the sample time (200 $\mu$sec) so that the oscillator is fully settled and stable before the data is sampled and held.

Normal Vector Determining

The ability to constantly monitor the distance between the nozzle and the surface of the workpiece provided using the sampled sensing apparatus above allows improved operation of the automatic focus control of a laser beam tool typically used for cutting or welding. The automatic focus control according to the present invention differs from prior systems by using the existing x y z system axes upon which the two rotary axes C and D ride to effect focus control, or, a by controlling a constant gap between the tip of the nozzle and the workpiece.

Figure 5:
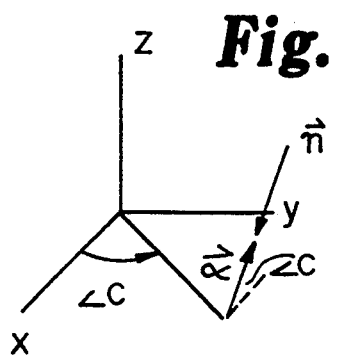
FIG. 5 shows the orientation of the $\bar{d}$ and $\bar{n}$ axes in the x, y, z and C D system.

Since the $\vec{d}$ direction of the beam delivered by the positioner is a function only of angles C and D, as shown in FIG. 5, the laser process controller or computer uses the C/D angle data to produce a vector equal to $\vec{d}$ using the three linear axes. Vector translation in this case is parallel to the direction of the beam.

Figure 2:
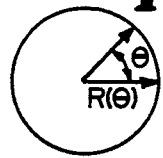
FIG. 2 is an illustration showing variation of the radius of a workpiece as a function of rotation.
Figure 6:
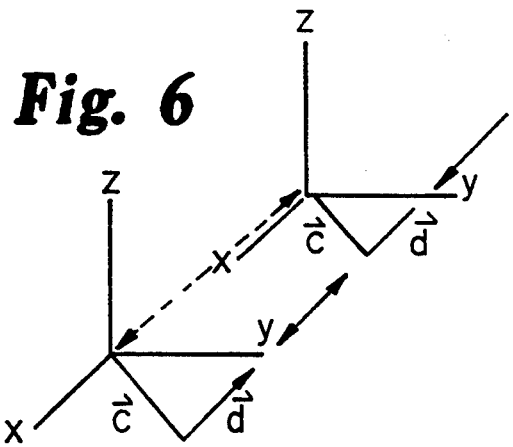
FIG. 6 shows vector translation.

The capacitive sensor of FIG. 2, as illustrated in FIG. 6, measures the capacitance between the nozzle tip and the workpiece and the servo position loop of the CNC, and causes the linear axes of the machine to move in the direction of the $\vec{d}$ vector to maintain a constant value of capacitance and hence a constant distance between the nozzle tip and the part as the nozzle is moved across the surface of the part in response to the machining program. With the automatic control of the present invention, the location of the focal point is always known and it is used to compute the amount of travel required of the linear axes to achieve a constant gap.

The control methodology of the present invention contrasts with other types of focus control known in the prior art which use a small linear servo system to move the lens and nozzle assembly on the beam axis only in order to keep a constant gap between the nozzle tip and the workpiece. In such systems lens/nozzle servo has a limited range, typically 0±0.2 inches from nominal, and operates independently of the part program. Thus the location of the focal point is known only when the lens servo is in its nominal or "no error" position, a situation which is not usually the case or focus control wouldn't be needed.

The success of the method of measuring the part surface normal vector in accordance with the present invention depends on two distinguishing features of the inventive system.

Figure 7:
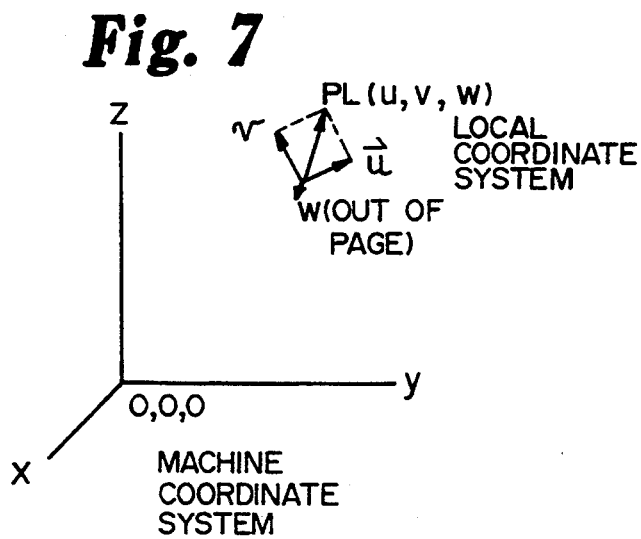
FIG. 7 illustrates transformation of the $\bar{u}$, $\bar{v}$ and $\bar{w}$ coordinates into the x, y, z system.

1. The location of the focal point in space is always known due to the unique AFC method.
2. The ability to establish a new focal coordinate system whose normal is the $\vec{d}$ axis vector, e.g. the direction of the beam. The local coordinate system has $\vec{u}$, $\vec{v}$, $\vec{w}$ coordinates which are uniquely transformable back to the xyz coordinate system of the machine, as shown in FIG. 7.

A point $\vec{p}$ in uvw local space can be written in vector form, as $\vec{p}=(\vec{p}\cdot\vec{u})\vec{u}+(\vec{p}\cdot\vec{v})\vec{v}+(\vec{p}\cdot\vec{w})\vec{w}$ where "." indicates the dot product, a scalar. Thus $(\vec{p}\cdot\vec{u})$ is the $\vec{u}$ component of $\vec{p}$, etc. The focal point becomes the origin of the new coordinate system and is also known in the machine coordinate system. Likewise $\vec{u}$, $\vec{v}$, and $\vec{w}$ are known in terms of the machine coordinate system. A point $\vec{p}$ programmed with respect to the origin (0,0,0) of the local coordinate system can be translated into the machine coordinate system at will.

Figure 8:
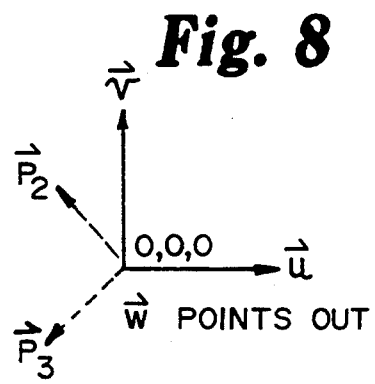
FIGS. 8 through 9 further illustrate the coordinate transformations.
Figure 9:
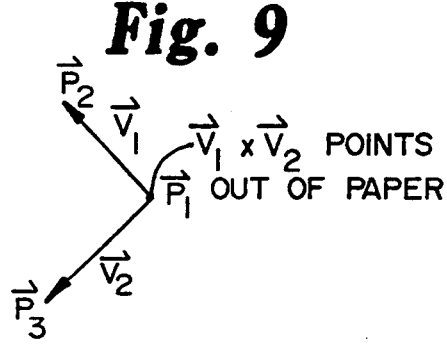
Figure 9A:
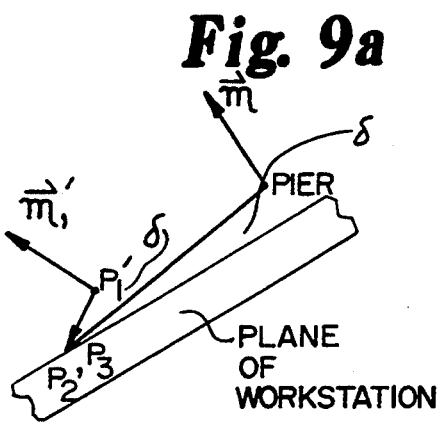

Steps for finding unit normal vector:

1. The beam positioning head ($\vec{d}$ axis) is pointed approximately normal to the part surface after translating the focal point of the to the correct point, usually a point located on a scribed line on a part to be processed. This is the usual teaching process.
2. At this point a plane is set parallel to the beam positioning head d axis and a local orthogonal coordinate system is established based on user criteria but where $\vec{w}=-\vec{d}$. The focal point becomes the origin of the new coordinate system.
3. A part program for the machine is then written in the local coordinate system with respect to its original focal point. The program is written to define three points on the part surface in the u/v plane which must be non-collinear and preferably equidistant from the local origin. The distance from the three points to the origin is user selectable, as will be explained later. See FIG. 8. The part program causes the beam positioning head focal point to move from the origin to point $\vec{P}_1$, $\vec{P}_2$ and $\vec{P}_3$ while under automatic focus control, while maintaining a constant gap between nozzle and workpiece, and the coordinates of all points $P_1$, $P_2$, $P_3$ plus the focal point are then recorded for each point. These three points define the actual plane of the part surface, a plane whose normal vector is the unit normal vector. The points may be recorded in either coordinate system so each point in one coordinate system in transformable into the other. What is important is that the part program be executed in the local coordinate system with AFC on to avoid collision between the nozzle and the part since the part program was written in the $\vec{u}$, $\vec{v}$ plane (e.g. w=0), the part surface itself will not generally be in the uv plane unless a perfect guess was made and $\vec{d}=-\vec{n}$ exactly. AFC then, causes the plane of the part to be measured, since the gap between the nozzle and the part is constant.
4. A vector $\vec{V}_1$ is established from $\vec{P}_1$ to $\vec{P}_2$ and a second vector $\vec{V}_2$ is established between $\vec{P}_1$ and $\vec{P}_3$.

$$\vec{V}_1 = \vec{P}_2 - \vec{P}_1$$
$$\vec{V}_2 = \vec{P}_3 - \vec{P}_1 \quad \text{See FIG. 9}$$

Vector $\vec{V}_1 \times \vec{V}_2$ produces a vector normal to the plane of the part and $$\frac{V_1 \times V_2}{|V_1 \times V_2|} = \vec{n} = \vec{Ii} + \vec{Jj} + \vec{Kk} \text{ where } I, J, K$$

are the components of the unit normal vector and $\vec{n}$ is the true unit surface normal vector. In this case, it is important that the points be programed in order with counterclockwise rotation or else the crossproduct will reverse direction.

5. The objective now is to cause the C and D axes to move, by changing their angles, in such a way as to cause $\vec{d}$ to equal $-\vec{n}$, the true normal vector, thus causing the beam positioning head to sense the surface normal vector and automatically align itself to it. A number of relationships exist for relating angles C and D to the unit normal vector, $\vec{n}$. Among them:

$$C = -tan^{-1}(I/J), D = -sin^{-1}(K)$$

where I, J and K are the components of the calculated unit normal vector in the machine coordinate system.

When angles C and D are changed to the new calculated values, then vector $\vec{d}$ will be parallel to $\vec{n}$ and point is the opposite direction, e.g. $\vec{d}=-\vec{n}$.

Figure 10:
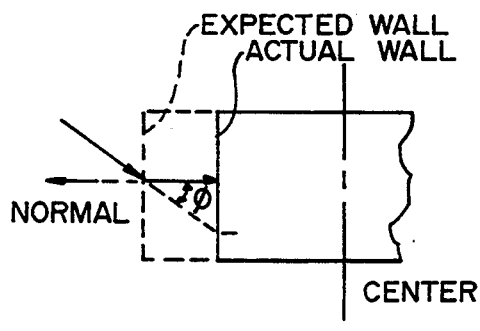
FIG. 10 shows the errors in the normal vector which occur due to nozzle gap errors when the workpiece radius is small relative to the radius of points $\bar{P}_1$, $\bar{P}_2$ and $\bar{P}_3$.

6. The programmed radius of points $\vec{P}_1$, $\vec{P}_2$, $\vec{P}_3$ above the data point which is the origin of the local system provides a good estimation of $\vec{n}$ at the origin if the radius is small compared to the radius of curvature of the part at that point. However, if the radius is too small, changes in height of the nozzle above the part, due perhaps to slight focus control errors in the $\vec{w}$ direction will cause larger relative movement of $\vec{n}^1$ than if the radius were larger. See FIG. 10, which shows that $\vec{n}_1$ is deflected a much greater amount with a constant error $\delta$ in sensing the true part surface.

We have found that a radius of 0.05 " for the points surrounding the taught point is satisfactory in most instances. What is important is:

1. Knowing the coordinates of the focal point while under control.
2. Establishing a local coordinate system whose origin and focal point (a desired point on the part surface) and the orthogonal system is known with respect to the machine coordinate system.
3. Writing a part program in the local coordinate system to cause the machine to move to $P_1$, $P_2$ and $P_3$ and record the coordinates with AFC active to avoid collisions between the nozzle and the part.
4. Defining the true unit normal vector $\vec{n}$ as to the cross product of the vectors $$\vec{V}_1 \& \vec{V}_2, \vec{n} = \vec{n}_1 = \frac{V_1 \times V_2}{|V_1 \times V_2|}$$

5. Causing angles C and D to change to the new coordinate values such the new $\vec{d}=-\vec{n}$. Note that 3 above allows a standard part program defining $\vec{P}_1$, $\vec{P}_2$ and $\vec{P}_3$ be written regardless of the orientation of the beam positioner head. As an added refinement, one could allow points $\vec{P}_1$, $\vec{P}_2$ and $\vec{P}_3$ to be taken in any order or any rotation (clockwise or counterclockwise, e.g. CW or CCW) if the following test is made. (This could occur if manual teaching of $P_1$, $P_2$ and $P_3$ were done). We expect that the calculated normal vector will be of opposite sign of the taught $\vec{d}$ axis vector since they are pointed roughly 180° from each other. Thus the dot product of $\vec{d}$ and $\vec{n}$, $\vec{d}\cdot\vec{n}$ should be <0. If it is not, then the sign of the cross product $$\vec{n}_1 = \frac{V_1 \times V_2}{|V_1 \times V_2|}$$

should be reversed since it was taken in the wrong order or rotation. e.g.:

$$\bar{n}_2 = \bar{n}_1 \text{ or } I_2 = -I_1, J_2 = -J_1, K_2 = -K_1$$

Selectable Seek Automatic Focus Control

The ability of the machining system of the present invention to control the gap between the nozzle and the workpiece and the ability of the system to determine the unit normal vector to the surface of the workpiece allow the system to operate to reduce certain system machining errors.

Figure 3:
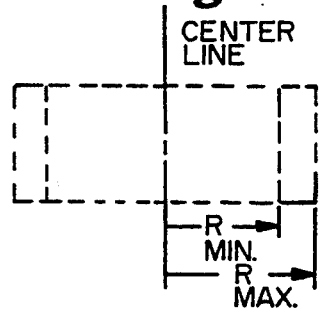
FIG. 3 illustrates the movement of the workpiece wall positions as the radius varies.

Consider a metal cylinder such as a jet engine combustion chamber. Being large and made of relatively thin metal, it is usually "out of round" or has "run out" i.e. its radius varies as a function of rotation. Runout errors of 0.1 inch or more are common. A front view of the cylinder would show a wall displacement from its nominal or expected position of $\Delta R = R_{max} - R_{min}$ as shown in FIG. 3. If one is cutting with the beam axis oriented normal to the surface, there is no problem; however, if one is cutting at an angle which is intentionally off normal to the surface, then large errors between the desired, i.e. the programmed, cut path and the actual cut path on the part will result.

In order to fully appreciate the magnitude of the errors, consider the following: Specifications require that a row of holes be cut in a cylinder at an angle 75° off normal to the part surface, or 15° off the plane of the part, and that the row of holes be on a "water line", e.g., a straight line in the front view. FIG. 3 shows the hole displacement error due to autofocus which only operates in a direction parallel to the beam.

It can be shown that autofocus in the direction of the beam causes a sinusoidal displacement of holes relative to the desired waterline where amplitude is proportional to the amount of runout and the angle off normal at which cutting occurs.

If $\phi = 0°$ e.g. the beam is normal to the part surface, then $\tan\phi = 0$ and no displacement error results. However, if $\phi = 75°$ then $\tan 75° = 3.73$. Therefore $E = 3.73 \times \Delta R$. If $\Delta R = 0.1$ inch, then $3.73 \times 0.1 = 0.373$ inches.

The system of the present invention uses the linear axes of the machine to produce the vector that AFC of the nozzle will move parallel to in response to an error signal from the gap sensor (in the case of the preferred embodiment of the invention, the capacitive sensor used in a sampling interval when the beam is off). The desired vector is often parallel to the beam, and is user selectable, but when cutting or welding off normal to the part surface, a vector normal to the part surface is chosen as the AFC axis.

Focal Point Locating

In setting up the system of the present invention and teaching the system the coordinates of the points necessary to establish the part machining program a determination must be made as to the location of the focal point of the laser beam. As stated above, the crude determination of the location of the focal point can be made by sensing the changes in acoustic noise or in appearance of the plume as the location is varied. In either case, whether using acoustic or of emission to find the focal point, much greater accuracy and repeatability can be obtained by using least squares curve fitting techniques on the data to determine the coefficient $a_1$, $a_2$ of a parabola of the form $y(x) = a_0 + a_1 X + a_2 X^2$. This technique fits the data to a known parabola with the least error. The location of the focal point can then be calculated by differentiating the position equation $$dy/dx = a_1 + 2a_2 x$$

Figure 11A:
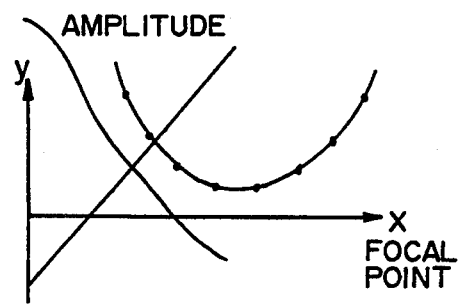
FIGS. 11 A and B illustrate the least square curve fitting technique.
Figure 11B:
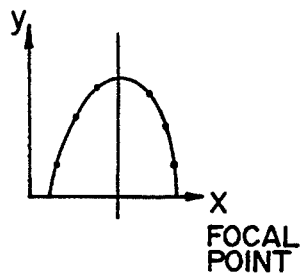

If y is equal to the amplitude of the acoustic emission and x represents the location of the focal point, then data points of y as a function of x might look as on FIG. 11.

FIG. 11 shows acoustic emission as a function of distance x. The position of the focal point is at the maxima of the curve. The focal point is then calculated by setting $$dy/dx = a_1 + a_2 x = 0$$

then $$X = -a_1/2a_2,$$

thus the location of the focal point can be very accurately calculated. Since the focal region is symmetrical about the focal point, a high degree of data fit to a parabola is ensured.

Classical least squares curve fitting equations are used to determine coefficients $a_0$, $a_1$, $a_2$. It is useful to make two passes on the material, one from above the focal point and one from below. Averaging the two answers removes time delays on reading the data as a source of error.

Figure 12:
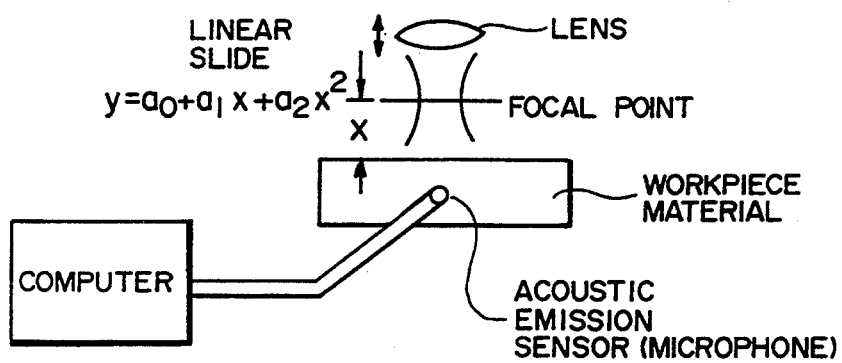
FIG. 12 is a diagram showing the equipment arrangement for the focal point locating method.

As shown on FIG. 12, the computer which controls the operation of the machine may be programmed using conventional programming techniques to sample and store acoustic emission data, calculate coefficients $a_0$, $a_1$, $a_2$ and calculate the location of the maxima $$X = -a_1/2a_2.$$

In addition, the quality of the data can be determined by calculating the standard deviation of the data and comparing it to a known good number.

Fixture Identification

The usefulness of the system in accordance with the present invention is enhanced by providing automatic means for determining what part is on the machine to be processed and for automatically calling up the machining program appropriate to the part. In a preferred embodiment of the present invention the system identifies the fixture in which the workpiece is mounted and selects the appropriate program to determine the operations to be performed based upon that identification.

One of the methods to provide for identification of the fixture is by scanning. Scanning is the process where a fixture is evaluated in some way to determine its fixture identification number—the fixture ID. While there are a number of ways to scan a fixture, such as with a barcode reader, in a preferred embodiment of the invention a unique method of scanning using the AFC for the system will be the principal method used.

Scanning with the AFC is accomplished by placing a sequence of metal pegs on the fixture in a pattern that corresponds to a binary representation of the fixture ID. Up to 16 pegs may be placed on a fixture allowing fixture identification numbers from 0 to 65,535.

A specific part program stored in the system, the scanning program, moves the positioner to the scan start location, using standard codes, activates the AFC momentarily to set the proper height over the first peg (which must be present, see below), and issues a scan command. The scan command contains the scan direction, the number of positions to read, and the spacing between pegs. The positioner moves in the scan direction while taking AFC readings at the programmed intervals.

The first two digits of each code must be a 1 (metal present) followed by a 0 (metal absent) to establish the threshold count. The threshold will be calculated as the midpoint between these first two readings. The threshold will change with changes in calibration and/or standoff distance. Each subsequent reading will be evaluated as a 0 or 1 binary digit by comparing the AFC count at that position to the threshold count.

All machining programs that can be selected by a fixture scan will be entered in a scan table as part of the scanning part program. Each table entry may contain an ID number, a program name, and an optional line number. The number of entries in the scan table is limited only by memory size.

After completing a scan, the CNC compares the resulting binary number with the values in the scan table. If a match is found, the associated part program file is activated and executed (starting from the entered line number, or from line 1 if no line number was entered in the table). If no ID match is found, or the file does not exist, the program halts and an error message is displayed.

Each part program returns control to the scanning program on completion so that scanning can continue.

I claim:

1. In a system for machining a workpiece with a laser beam tool, control means for maintaining a controlled distance between the tool and a workpiece surface, said control means comprising, in combination:
   a. capacitive sensor means for measuring the capacitance between the tool and the surface of the workpiece;
   b. beam control means for driving the laser beam for the tool with periodic pulses separated by a refractory interval
   b. sampling means for taking a measurement of the capacitance between the tool and the workpiece during the refractory interval.

2. In a system having an automatic focus control for moving the focal point of a laser beam by movements along orthogonal machine translation axes x, y, and z and orthogonal rotational axes C and D of a multiaxis processing head mounted on the machine, a method for determining a unit normal vector at a point on the surface of a workpiece, said method comprising the steps of:
   a) positioning the focal point of the beam on a reference point on the surface of the workpiece;
   b) adjusting the C and D processing head axes to orient the beam substantially normal to the surface of the workpiece and the x, y, and z axis to position the focal point coincident with the reference point to orient the beam axis, $\vec{d}'$ of the directing head approximately normal to the surface of the workpiece at the reference point;
   c) defining a local orthogonal coordinate system u, v, and w where $\vec{w}$ is the unit normal vector of the workpiece, is aligned with the $-\vec{d}$ by varying the C and D axis rotations and the origin of said local coordinate system is positioned coincident with the focal point of the beam by variation of the x, y, and z axis positions;
   d) creating a beam focal point moving program in the local coordinate system to move the focal point of the beam to three points P1, P2 and P3 on the workpiece surface which are non-collinear and define a plane to which the true unit normal vector is normal, said points positioned preferably equidistant from the origin of the local coordinate system;
   e) executing the beam focal point moving program in the local coordinate system while the automatic focus control is active thereby to avoid collision between the adjustable head and the workpiece and while recording the coordinates of the x, y, z, C and D axes at points p1 p2 and p3 while the AFC maintains a constant gap;
   f) computing the orientation of a true unit normal vector to the workpiece at the reference point by calculating the cross product of the vectors v1 between P1 and P2 and v2 between P1 and P3, or $$\vec{n_1} = \frac{\vec{V_1} \times \vec{V_2}}{|\vec{V_1} \times \vec{V_2}|}$$

g) adjusting the angles of C and D rotational axes to orient $\vec{d}$ of the adjustable head such that an adjusted $\vec{d}$ is aligned with and in opposition to the unit normal vector $\vec{n}$ at the reference point of the workpiece.

3. In a system having an automatic focus control for moving the focal point of a laser beam by movements along orthogonal machine translation axes x, y, and z and C and D rotational axes of an adjustable beam directing head mounted on the machine, a method for positioning the focal point of a laser beam at selected points on a surface of a workpiece, comprising the steps of:
   a) varying the orientation of the C and D rotational axes thereby to adjust the beam axis of the directing head an expected predetermined orientation relative to the surface of the workpiece and aligning the x, y, and z axes to place the beam on one of the selected points;
   b) using a gap sensor for generating a signal proportional to the displacement between the directing head and the surface of the workpiece and moving the directing head along a selected x, y, and z coordinate axis to maintain a predetermined displacement as the beam focal point is moved through selected points.

4. The invention of claim 2 wherein the predetermined orientation of the beam axis, $\vec{d}$ is normal to the surface of the workpiece.

5. In a system for machining a workpiece with a laser beam tool which includes control means for maintaining a controlled distance between the tool and a workpiece surface, a method for determining when the focal point of the laser beam is optimally positioned at the surface of the workpiece, said method comprising the steps of:
   a. monitoring an indicia of optimal beam interaction with the surface of the workpiece as the focal point of the beam is moved toward the surface of the workpiece from above and below the workpiece;
   b. recording the coordinates corresponding to the point where the indicia indicated maximum activity for movement of the beam in both directions toward the surface of the workpiece; and c. analyzing the coordinate points obtained in a. and b. above by a least squares method to obtain the optimum gap distance for positioning the focal point of the beam at the surface of the workpiece.

6. The method of claim 5 wherein the indicia of optimal beam interaction with the workpiece is the acoustic noise generated as the beam cuts the surface of the workpiece.

7. The method of claim 5 wherein the indicia of optimal beam interaction with the workpiece is the intensity of the blue spark generated as the beam cuts the surface of the workpiece.

8. In a system for machining a workpiece with a laser beam tool which includes control means for maintaining a controlled distance between the tool and a workpiece surface, apparatus for determining when the focal point of the laser beam is optimally positioned at the surface of the workpiece, said apparatus comprising, in combination:

a. means for monitoring an indicia of optimal beam interaction with the surface of the workpiece as the focal point of the beam is moved toward the surface of the workpiece from above and below the workpiece;
   b. means for recording the coordinates corresponding to the point where the indicia indicated maximum activity for movement of the beam in both directions toward the surface of the workpiece; and
   c. means for analyzing the coordinate points obtained in a. and b. above by a least squares method to obtain the coordinates for commanding the machine to maintain an optimum gap distance for positioning the focal point of the beam at the surface of the workpiece.

9. The apparatus of claim 8 wherein means for monitoring the indicia of optimal beam interaction with the workpiece is acoustic means for measuring the acoustic noise generated as the beam cuts the surface of the workpiece.

10. The method of claim 8 wherein the means for monitoring the indicia of optimal beam interaction with the workpiece is an optical means for detecting the intensity of the blue spark generated as the beam cuts the surface of the workpiece.

11. In a system for machining a workpiece with a laser beam tool including means for measuring the distance between a sensor positionable by the automatic focus control of the machine and a workpiece surface, means for determining the programs to be run by the machine to process a workpiece in accordance with one of a plurality of processing programs, said means comprising, in combination:

a. sensor means for measuring an indicia applied to a fixture for a workpiece;
   b. means for automatically and sequentially moving the sensor means to a series of reference points at predetermined locations on the fixture in accordance with a fixture identification program and measuring the indicia at each point; and
   c. means for decoding the indicia pattern to identify and select the program to be run by the machine in accordance with the coding on the particular fixture.

12. In a system for machining a workpiece with a laser beam tool including means for measuring the distance between a sensor positionable by the automatic focus control of the machine and a workpiece surface, means for determining the programs to be run by the machine to process a workpiece in accordance with one of a plurality of processing programs, said means comprising, in combination:

a. sensor means for measuring the capacitance between it and the surface of the workpiece;
   b. means for automatically and sequentially moving the sensor means to a series of reference points at predetermined locations on a fixture in accordance with a fixture identification program and measuring the capacitance at each point to determine whether or not a peg is present; and
   c. means for decoding the peg pattern to identify and select the program to be run by the machine in accordance with the coding on the particular fixture.

* * * * *